US009228906B2

(12) United States Patent
Tanabe (10) Patent No.: US 9,228,906 B2
(45) Date of Patent: Jan. 5, 2016

(54) QUARTZ-TEMPERATURE-MEASUREMENT PROBE AND QUARTZ-TEMPERATURE-MEASUREMENT DEVICE

(71) Applicant: Masato Tanabe, Yokohama (JP)

(72) Inventor: Masato Tanabe, Yokohama (JP)

(73) Assignee: Masato Tanabe, Yokohama (JP)

( * ) Notice: Subject to any disclaimer, the term of this patent is extended or adjusted under 35 U.S.C. 154(b) by 0 days.

(21) Appl. No.: 14/376,780

(22) PCT Filed: Sep. 2, 2013

(86) PCT No.: PCT/JP2013/073478
§ 371 (c)(1),
(2) Date: Aug. 5, 2014

(87) PCT Pub. No.: WO2014/045848
PCT Pub. Date: Mar. 27, 2014

(65) Prior Publication Data
US 2015/0023388 A1    Jan. 22, 2015

(30) Foreign Application Priority Data
Sep. 21, 2012  (JP) .................................. 2012-208183

(51) Int. Cl.
*G01K 7/32* (2006.01)
*G01K 7/24* (2006.01)

(52) U.S. Cl.
CPC ...................................... *G01K 7/32* (2013.01)

(58) Field of Classification Search
CPC ............ G01K 7/32; G01K 7/203; G01K 7/24
USPC ........ 374/100, 117–119, 172, 184, 1; 331/66, 331/117 R, 167, 54, 175, 176, 158, 177 R, 331/23; 702/130, 99
See application file for complete search history.

(56) References Cited

U.S. PATENT DOCUMENTS 3,355,949 A * 12/1967 Elwood et al. ................. 374/117
3,626,289 A * 12/1971 Vinson et al. .................. 340/661
(Continued)

FOREIGN PATENT DOCUMENTS

JP   58143227 A  *  8/1983
JP   59-032834 A     2/1984
(Continued)

OTHER PUBLICATIONS

International Search Report for PCT/JP2013/073478 dated Dec. 3, 2013.

*Primary Examiner* — Gail Kaplan Verbitsky
(74) *Attorney, Agent, or Firm* — Sughrue Mion, PLLC (57) ABSTRACT

A crystal oscillator (31) (Y-cut) has a temperature characteristic in which its oscillating frequency significantly changes with temperature, whereas a crystal oscillator (32) (AT-cut) has a temperature characteristic in which its oscillating frequency is stable with temperature. Crystal oscillators (31, 32) are cut from a raw material of the same type and configured to be substantially equal in shape, material, and size, and provide a combination of oscillation frequencies such that the frequency of a signal generated by a differential frequency circuit (35) will be less than or equal to 10 kHz within a measuring temperature range of 21 to 30° C. The frequency of a signal generated by differential frequency generating circuit (35) is output to a measurement apparatus main unit and a frequency counting circuit (15) measures the frequency of this signal by a reciprocal counting method to obtain at least eight or more significant digits.

3 Claims, 10 Drawing Sheets

(56) References Cited

U.S. PATENT DOCUMENTS

| | | | | |
|---|---|---|---|---|
| 3,879,992 A * | 4/1975 | Bartera | | 73/24.01 |
| 4,039,969 A * | 8/1977 | Martin | | 331/40 |
| 4,163,230 A * | 7/1979 | Konii | | 368/84 |
| 4,270,547 A * | 6/1981 | Steffen et al. | | 600/484 |
| 4,305,041 A * | 12/1981 | Frerking | | G04G 3/027 |
| | | | | 327/113 |
| 4,486,624 A * | 12/1984 | Puhl et al. | | 370/278 |
| 4,496,907 A * | 1/1985 | Funk et al. | | 324/445 |
| 4,537,515 A * | 8/1985 | Dinger | | G04F 5/06 |
| | | | | 331/176 |
| 4,872,765 A * | 10/1989 | Schodowski | | 374/117 |
| 5,214,668 A * | 5/1993 | Satou et al. | | 374/117 |
| 5,400,269 A * | 3/1995 | White | | G01P 15/18 |
| | | | | 318/600 |
| 5,546,810 A * | 8/1996 | Arikawa | | G01L 9/0022 |
| | | | | 73/702 |
| 5,869,763 A * | 2/1999 | Vig et al. | | 73/580 |
| 6,217,211 B1 * | 4/2001 | Hesky | | 374/4 |
| 6,695,475 B2 * | 2/2004 | Yin | | 374/171 |
| 7,387,435 B2 * | 6/2008 | Kishi | | 374/117 |
| 7,728,684 B2 * | 6/2010 | Tozer | | 331/176 |
| 8,830,004 B2 * | 9/2014 | Koyama et al. | | 331/66 |
| 2003/0053516 A1 * | 3/2003 | Atherton | | 374/143 |
| 2010/0295535 A1 | 11/2010 | Todorokihara | | |
| 2012/0229220 A1 * | 9/2012 | Quevy et al. | | 331/41 |
| 2013/0208763 A1 * | 8/2013 | Uwe et al. | | 374/171 |
| 2014/0292424 A1 * | 10/2014 | Akaike et al. | | 331/70 |

FOREIGN PATENT DOCUMENTS

| | | |
|---|---|---|
| JP | 63-311133 A | 12/1988 |
| JP | 2003-023339 A | 1/2003 |
| JP | 2003-149058 A | 5/2003 |
| JP | 2010-271091 A | 12/2010 |
| JP | 4678892 B1 | 4/2011 |
| JP | 2012-032194 A | 2/2012 |
| JP | 5152944 B1 | 2/2013 |
| JP | 2014-062816 A | 4/2014 |

* cited by examiner

| Measurement temperature / oscillating frequency | 21°C | 25°C | 30°C |
|---|---|---|---|
| crystal oscillator 31 (Y-cut) | 10,591,000Hz | 10,595,000Hz | 10,600,000Hz |
| crystal oscillator 32 (AT-cut) | 10,590,000Hz | 10,590,000Hz | 10,590,000Hz |
| Δf(f(Y)−f(AT)) | 1,000Hz | 5,000Hz | 10,000Hz |

QUARTZ-TEMPERATURE-MEASUREMENT PROBE AND QUARTZ-TEMPERATURE-MEASUREMENT DEVICE

CROSS REFERENCE TO RELATED APPLICATIONS

This application is a National Stage of International Application No. PCT/JP2013/073478 filed Sep. 2, 2013, claiming priority based on Japanese Patent Application No. 2012-208183 filed Sep. 21, 2012, the contents of all of which are incorporated herein by reference in their entirety.

TECHNICAL FIELD

The present invention relates to a quartz temperature measuring probe and a quartz temperature measurement device for measuring temperature based on the oscillation frequencies of crystal oscillators.

BACKGROUND ART

A crystal oscillator has its natural oscillating frequency (vibrating frequency) that is determined by its shape or the like. It is known that this oscillating frequency is expressed by the following equation.

$$f = \frac{n}{2t} \cdot \sqrt{\frac{Cij}{\rho}} \qquad [\text{Equation 1}]$$

Variables in the equation are as follows:
f: Natural oscillating frequency
n: Overtone order
t: Thickness of crystal oscillator
ρ: Density
Cij: Elastic constant In general, a crystal oscillator is used as a frequency source in, inter alia, wireless communication equipment and various measuring instruments, as an oscillation element generating a frequency that less changes with temperature and is regarded as the most stable. However, some crystal oscillator has a characteristic in which its oscillating frequency significantly changes with temperature, which is dependent on a cut angle (cut orientation), which is an angle at which it is cut from a crystal material, as typified by Y cut, LC cut, etc.

Taking advantage of such a characteristic of a crystal oscillator, a temperature measurement apparatus is used that employs a crystal oscillator having a cut orientation giving a linear change of frequency with temperature and makes temperature measurement by measuring the oscillating frequency of the crystal oscillator (for example, refer to Patent Literatures 1 and 2). In addition, a quartz temperature measurement device arranged to make temperature measurement by measuring a differential frequency between two crystal oscillators exists (for example, refer to Patent Literature 3). Since the frequency of an electric signal can be measured with high precision, according to such a temperature measurement apparatus using crystal oscillators, it is achievable to make temperature measurement with measurement precision of $\frac{1}{10000}°$ C. (one ten-thousandth of 1° C.).

By the way, global environmental changes have recently become an issue of concern. Therefore, in order to make a long-term observation of changes in global environment including monitoring crustal movements, a change in seawater temperature, etc., measuring temperature of groundwater, deep wells, crustal heat, deep sea water temperature, etc. is performed by using a quartz temperature measurement device as discussed above. For weather observation and marine weather observation, quartz temperature measurement device as discussed above is also used for an application in which it is installed in the Pacific Ocean to measure seawater temperature in an unmanned manner.

In such a case of measuring deep sea water temperature or the like, although it is possible to observe environmental changes even on the level of measurement precision of $\frac{1}{10000}°$ C. (one ten-thousandth of 1° C.), it is required to measure seawater temperature or the like with even higher precision in order to measure a minute change in temperature.

CITATION LIST

Patent Literatures

Patent Literature 1: Japanese Unexamined Patent Application Publication No. 2003-23339
Patent Literature 2: Japanese Unexamined Patent Application Publication No. 2003-149058
Patent Literature 3: Japanese Patent No. 4678892

SUMMARY OF INVENTION

Technical Problem

In the related art as mentioned above, temperature measurement involves a wide variety of temperature sensors; using these sensors, it was possible to make temperature measurement with measurement precision of $\frac{1}{10000}°$ C. (one ten-thousandth of 1° C.), but it was not achievable to make temperature measurement with higher precision on the order of $\frac{1}{1000000}°$ C. (one millionth of 1° C.) to $\frac{9}{1000000}°$ C. (nine millionths of 1° C.).

An object of the present invention is to provide a quartz temperature measuring probe and a quartz temperature measurement device that make it possible to achieve temperature measurement with high precision on the order of $\frac{1}{1000000}°$ C. (one millionth of 1° C.) to $\frac{9}{1000000}°$ C. (nine millionths of 1° C.) in making temperature measurement based on the oscillation frequencies of crystal oscillators.

Solution to Problem

The present invention resides in a quartz temperature measuring probe including:
a first crystal oscillator of AT-cut orientation having a temperature characteristic in which its oscillating frequency is stable with temperature;
a second crystal oscillator of Y-cut or LC-cut orientation having a temperature characteristic in which its oscillating frequency significantly changes with temperature as compared with the first crystal oscillator;
a first oscillation circuit that generates a signal of a specific oscillating frequency, using the first crystal oscillator as an oscillation element;
a second oscillation circuit that generates a signal of a specific oscillating frequency, using the second crystal oscillator as an oscillation element; and
a differential frequency generating circuit that generates a signal of a differential frequency component between an oscillating frequency from the first oscillation circuit and an oscillating frequency from the second oscillation circuit, wherein the first crystal oscillator and the second crystal oscillator are cut from a raw material of the same type and configured to be substantially equal in shape and material, and provide a combination of oscillation frequencies such that the frequency of a signal which is generated by the differential frequency generating circuit will be less than 10 kHz within a preset measuring temperature range.

In the present invention, the first crystal oscillator and the second crystal oscillator are cut from a raw material of the same type and configured to be substantially equal in shape and material. The differential frequency circuit generates a signal of a differential frequency component between an oscillating frequency from the first oscillation circuit and an oscillating frequency from the second oscillation circuit and temperature measurement is performed by measuring the frequency of this signal. Therefore, the first crystal oscillator and the second crystal oscillator are free from variation in various properties such as aging variation, and temperature measurement with high measurement precision becomes feasible.

Furthermore, in the present invention, the first crystal oscillator and the second crystal oscillator are arranged to provide a combination of oscillation frequencies such that the frequency of a signal which is generated by the differential frequency generating circuit will be a low frequency less than 10 kHz within a preset measuring temperature range. Therefore, according to the present invention, since frequencies to be measured in a temperature measurement process are low within a preset measuring temperature range, it becomes possible to achieve temperature measurement with high precision of, e.g., $9/1000000°$ C. (nine millionths of 1° C.).

The present invention resides in a quartz temperature measuring probe including:

a first crystal oscillator of AT-cut orientation having a temperature characteristic in which its oscillating frequency is stable with temperature;

a second crystal oscillator of Y-cut or LC-cut orientation having a temperature characteristic in which its oscillating frequency significantly changes with temperature as compared with the first crystal oscillator;

a first oscillation circuit that generates a signal of a specific oscillating frequency, using the first crystal oscillator as an oscillation element;

a second oscillation circuit that generates a signal of a specific oscillating frequency, using the second crystal oscillator as an oscillation element; and a differential frequency generating circuit that generates a signal of a differential frequency component between an oscillating frequency from the first oscillation circuit and an oscillating frequency from the second oscillation circuit, wherein the first crystal oscillator and the second crystal oscillator are cut from a raw material of the same type and configured to be substantially equal in shape and material, and provide a combination of oscillation frequencies such that the frequency of a signal which is generated by the differential frequency generating circuit will be less than or equal to 10 kHz within a preset measuring temperature range.

Furthermore, in the present invention, the first crystal oscillator and the second crystal oscillator are arranged to provide a combination of oscillation frequencies such that the frequency of a signal which is generated by the differential frequency generating circuit will be a low frequency less than or equal to 10 kHz within a preset measuring temperature range. Therefore, according to the present invention, since frequencies to be measured in a temperature measurement process are low within a preset measuring temperature range, it becomes possible to achieve temperature measurement with high precision of, e.g., $1/1000000°$ C. (one millionth of 1° C.).

The present invention also resides in a quartz temperature measurement device including:

a quartz temperature measuring probe including a first crystal oscillator of AT-cut orientation having a temperature characteristic in which its oscillating frequency is stable with temperature, a second crystal oscillator of Y-cut or LC-cut orientation having a temperature characteristic in which its oscillating frequency significantly changes with temperature as compared with the first crystal oscillator, a first oscillation circuit that generates a signal of a specific oscillating frequency, using the first crystal oscillator as an oscillation element, a second oscillation circuit that generates a signal of a specific oscillating frequency, using the second crystal oscillator as an oscillation element, and a differential frequency generating circuit that generates a signal of a differential frequency component between an oscillating frequency from the first oscillation circuit and an oscillating frequency from the second oscillation circuit; and a measurement apparatus main unit including a frequency counter that measures the frequency of a signal received from the quartz temperature measuring probe, conversion means that converts a frequency measured by the frequency counter to a measurement temperature, and a display unit that displays a measurement temperature obtained by the conversion means, wherein the first crystal oscillator and the second crystal oscillator are cut from a raw material of the same type and configured to be substantially equal in shape and material, and provide a combination of oscillation frequencies such that the frequency of a signal which is generated by the differential frequency generating circuit will be less than 100 kHz within a preset measuring temperature range.

The present invention also resides in a quartz temperature measurement device including:

a quartz temperature measuring probe including a first crystal oscillator of AT-cut orientation having a temperature characteristic in which its oscillating frequency is stable with temperature, a second crystal oscillator of Y-cut or LC-cut orientation having a temperature characteristic in which its oscillating frequency significantly changes with temperature as compared with the first crystal oscillator, a first oscillation circuit that generates a signal of a specific oscillating frequency, using the first crystal oscillator as an oscillation element, a second oscillation circuit that generates a signal of a specific oscillating frequency, using the second crystal oscillator as an oscillation element, and a differential frequency generating circuit that generates a signal of a differential frequency component between an oscillating frequency from the first oscillation circuit and an oscillating frequency from the second oscillation circuit; and a measurement apparatus main unit including a frequency counter that measures the frequency of a signal received from the quartz temperature measuring probe, a conversion means that converts a frequency measured by the frequency counter to a measurement temperature, and a display unit that displays a measurement temperature obtained by the conversion means, wherein the first crystal oscillator and the second crystal oscillator are cut from a raw material of the same type and configured to be substantially equal in shape and material, and provide a combination of oscillation frequencies such that the frequency of a signal which is generated by the differential frequency generating circuit will be less than or equal to 10 kHz within a preset measuring temperature range.

In addition, it is preferable that the frequency counter measures the frequency of a signal received from the quartz temperature measuring probe by a reciprocal counting method to obtain at least eight or more significant digits.

According to the present invention, since the frequency counter is adapted to measure the frequency of a signal received from the quartz temperature measuring probe by a reciprocal counting method, it is possible to make a frequency measurement at given precision without extending a measurement time period, even if the frequency of a signal received from the quartz temperature measuring probe is low. By measuring the frequency of a signal received from the quartz temperature measuring probe to obtain eight or more significant digits, it becomes possible to achieve temperature measurement with high precision of, e.g., $1/1000000°$ C. (one millionth of 1° C.).

Advantageous Effects of Invention

According to the present invention described above, it is possible to provide a quartz temperature measurement device that makes it possible to achieve temperature measurement with high precision on the order of $1/1000000°$ C. (one millionth of 1° C.) to $9/1000000°$ C. (nine millionths of 1° C.) in making temperature measurement based on the oscillation frequencies of crystal oscillators.

DESCRIPTION OF EMBODIMENTS

Next, an embodiment of the present invention is described in detail with reference to the drawings.

Figure 1:
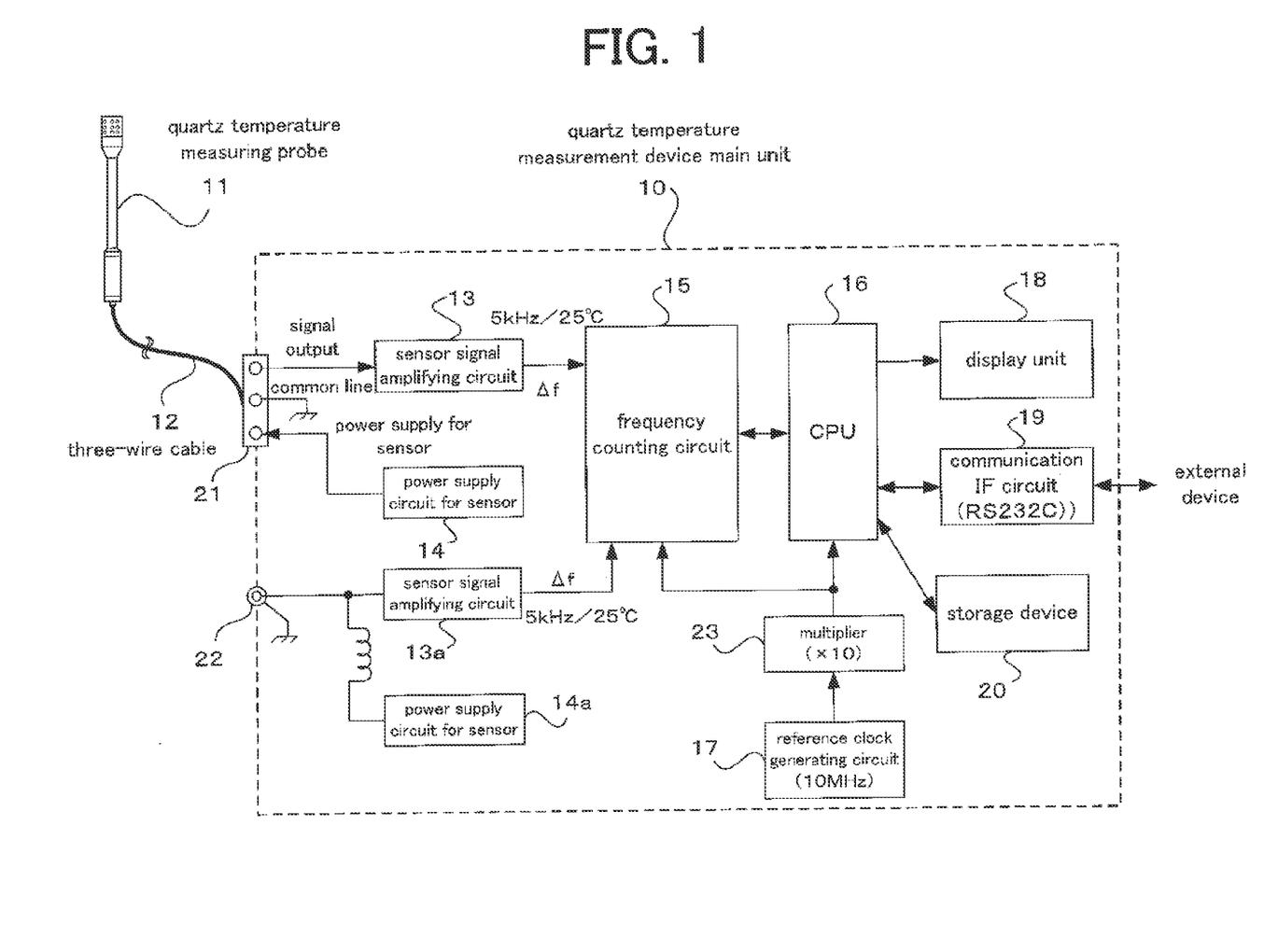
FIG. 1 is a diagram depicting a system configuration of a quartz temperature measurement device of an embodiment of the present invention.

FIG. 1 is a system diagram depicting a quartz temperature measurement device of an embodiment of the present invention.

As depicted in FIG. 1, the quartz temperature measurement device of the present embodiment is comprised of a quartz temperature measuring probe 11 that is positioned at a location where temperature should be measured, a measurement apparatus main unit 10 for making calculation and display of a measurement temperature based on a signal from the quartz temperature measuring probe 11, and a three-wire cable 12 for making connection between the quartz temperature measuring probe 11 and the measurement apparatus main unit 10.

As depicted in FIG. 1, the measurement apparatus main unit 10 includes sensor signal amplifying circuits 13, 13a, power supply circuits 14, 14a for sensor, a frequency counting circuit 15, a CPU 16, a reference clock generating circuit 17, a display unit 18, a communication interface (IF) circuit 19, a storage device 20, a three-wire connection terminal block 21, a BNC connector 22, and a multiplier 23 (×10).

The three-wire cable 12 making connection with the quartz temperature measuring probe 11 is connected to the three-wire connection terminal block 21 of the measurement apparatus main unit 10. This three-wire connection terminal block 21 is configured such that three wires of signal output, common line, and power supply for sensor are connected to the respective ports.

The BNC connector 22 is used when the quartz temperature measuring probe 11 and the measurement apparatus main unit 10 are connected by a coaxial cable. The crystal oscillator temperature measurement apparatus of the present embodiment is configured such that the quartz temperature measuring probe 11 and the measurement apparatus main unit 10 can be connected by either the three-wire cable or the coaxial cable.

The sensor signal amplifying circuits 13, 13a each amplify a signal output from the three-wire connection terminal block 21 or the BNC connector 22 and output the amplified signal to the frequency counting circuit 15. A signal that is amplified by the sensor signal amplifying circuits 13, 13a has a frequency f$\Delta$ of 5 kHz/25° C. This signal output will be described later. Here, the notation "/25° C." means the frequency when a measurement temperature is 25° C.

The power supply circuits 14, 14a for sensor are each for supplying a power source to a sensor employed in the quartz temperature measuring probe 11. In the present embodiment, as an example, a power supply circuit 14 for sensor supplies a voltage of 5 V as a power supply for sensor to the quartz temperature measuring probe 11 via the three-wire connection terminal block 21. A power supply circuit 14a for sensor feeds a power supply for sensor through a signal line to the BNC connector 22 and this power supply for sensor is superimposed on a signal line of the coaxial cable and transmitted to the quartz temperature measuring probe.

The reference clock generating circuit 17 in the present embodiment generates a clock signal of 10 MHz. The clock signal of 10 MHz generated by the reference clock generating circuit 17 is multiplied by a factor of 10 in the multiplier 23 and, then, a clock signal of 100 MHz is supplied to the frequency counting circuit 15 and the CPU 16 as an internal reference clock signal.

The frequency counting circuit 15 operates as a frequency counter that measures the frequency of a signal received from the quartz temperature measuring probe 11 and amplified through the sensor signal amplifying circuits 13, 13a. The frequency counting circuit 15 counts the frequency of a signal received from the quartz temperature measuring probe 11; in particular, it counts the frequency by a reciprocal counting method, using the internal reference clock of 100 MHz inputted from the multiplier 23.

The reciprocal counting method is a frequency measurement method using the reference clock signal which is generated at constant time intervals; in this method, frequency measurement is performed by setting a gate time corresponding to a signal period of a signal under measurement, measuring the signal period by measuring the number of the reference clock signals generated for this gate time, and calculating the reciprocal of the measured signal period. According to this reciprocal counting method, if a measurement time period is constant, a frequency can be measured to a given number of significant digits independent of the frequency of a signal under measurement. In other words, in the frequency measurement by the reciprocal counting method, the number of significant digits of a measurement frequency is determined only depending on the frequency of the reference clock signal and the measurement time period.

Since the frequency counting circuit 15 in the present embodiment performs frequency counting using the internal reference clock of 100 MHz, if the measurement time period is one second, it is possible to measure the frequency of a signal received from the quartz temperature measuring probe 11 with measurement precision of nine significant digits.

Besides the reciprocal counting method, there is another method of measuring the frequency of a signal, which is called a direct counting method. In this direct counting method, frequency measurement is performed by directly counting the number of input signals arrived for a unit time period. In a case where frequency measurement is performed by this direct counting method, when the frequency of a signal under measurement decreases, the number of input signals per unit time period decreases. Thus, the number of significant digits of a measurement frequency decreases with a decrease in the frequency of a signal under measurement. In the direct counting method, the measurement time period has to be extended for making an increment in the number of significant digits representing a measurement frequency while keeping the frequency of a signal under measurement constant. For example, to increment the number of significant digits by one digit, the measurement time period must be extended by ten times. Therefore, measurement for a long period is needed to attain a desired number of significant digits, which would be unrealistic for temperature measurement in which measurement needs to be performed periodically at constant intervals.

The CPU 16 acts as conversion means for converting a frequency measured by the frequency counting circuit 15 to a measurement temperature. A concrete method for converting a measured frequency to a measurement temperature will be described later. The CPU 16 causes the display unit 18 to display a measurement temperature thus obtained and outputs the measurement temperature to an external entity via the communication IF circuit 19. The CPU 16 may store a measurement temperature thus obtained into the storage device 20.

Figure 2:
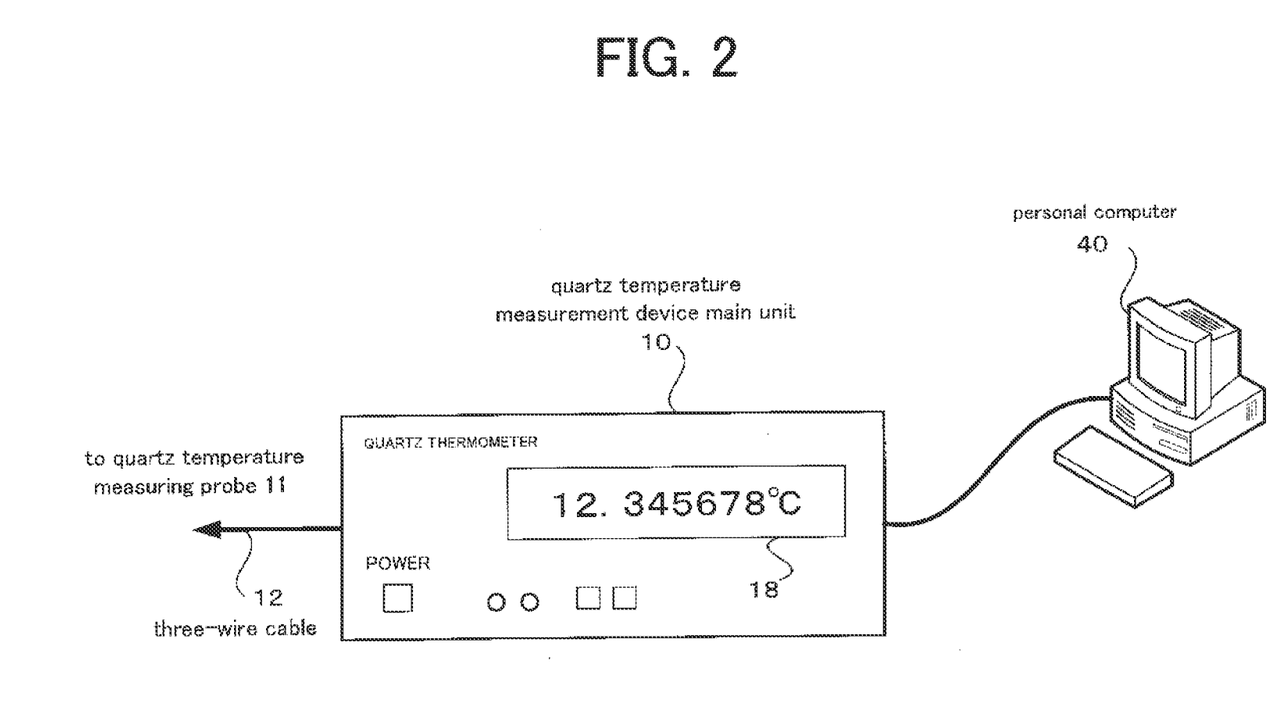
FIG. 2 is a diagram depicting an external view of the quartz temperature measurement device of an embodiment of the present invention.

An external view of the quartz temperature measurement device of the present embodiment is depicted in FIG. 2 which is configured as described in the foregoing context. In an example depicted in FIG. 2, here is presented the measurement apparatus main unit 10 to which a personal computer (hereinafter referred to as a PC) 40 is externally connected. As depicted in FIG. 2, in the quartz temperature measurement device of the present embodiment, the measurement apparatus main unit 10 is connected to the quartz temperature measuring probe 11 via the three-wire cable 12 and connected to the PC 40 by, e.g., an RS232 C cable or the like. In the measurement apparatus main unit 10, a measurement temperature is displayed on the display unit 18.

Next, a configuration of the quartz temperature measuring probe 11 depicted in FIG. 1 is described with reference to FIG. 3.

Figure 3:
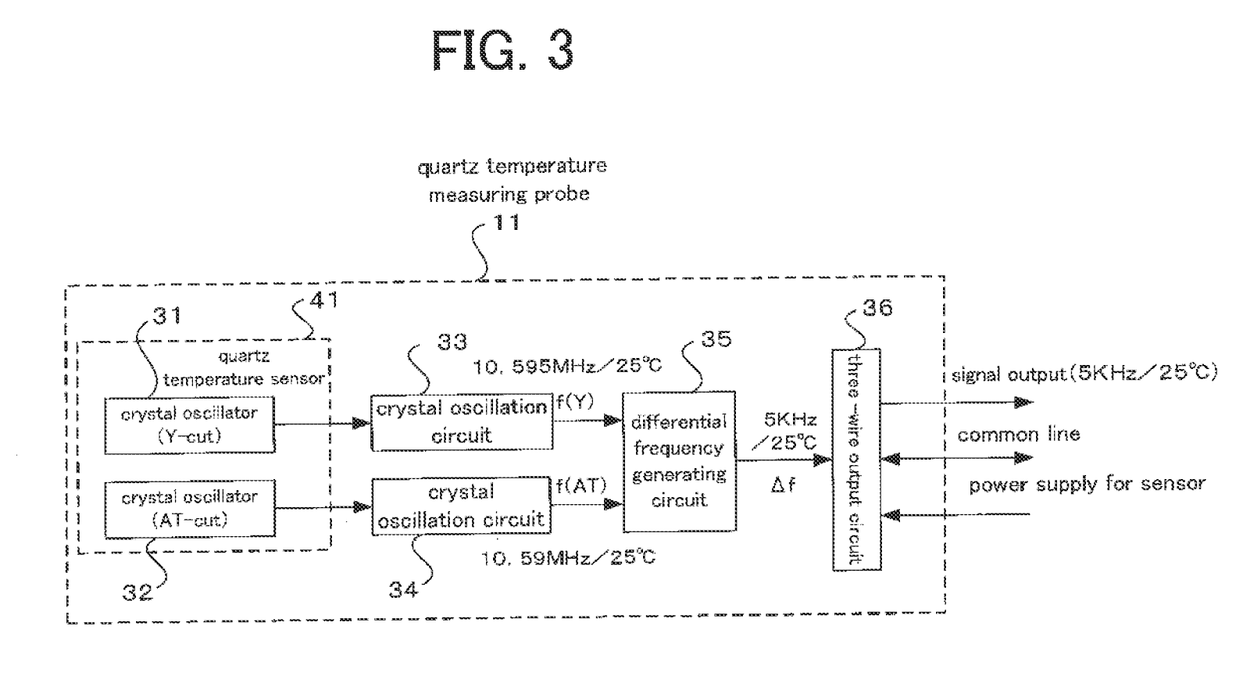
FIG. 3 is a block diagram depicting a configuration of a quartz temperature measuring probe 11 in FIG. 1

As depicted in FIG. 3, the quartz temperature measuring probe 11 includes a quartz temperature sensor 41, quartz oscillation circuits 33, 34, a differential frequency generating circuit 35, and a three-wire output circuit 36. The quartz temperature sensor 41 has a crystal oscillator 31 and a crystal oscillator 32.

The crystal oscillator 32 is a crystal oscillator having a temperature characteristic in which its oscillating frequency is independent of temperature, that is, a temperature characteristic in which its oscillating frequency is stable with temperature; it is, e.g., a crystal oscillator of AT-cut orientation.

The crystal oscillator 31 is a crystal oscillator having a temperature characteristic in which its oscillating frequency is dependent on temperature, that is, a temperature characteristic in which its oscillating frequency significantly changes with temperature as compared with the crystal oscillator 32. In the present embodiment, the description assumes that a crystal oscillator of Y-cut orientation is employed as such. Any crystal oscillator having a temperature characteristic in which its oscillating frequency is dependent on temperature may also be employed. Another concrete example of such one is a crystal oscillator of LC-cut orientation.

Figure 4:
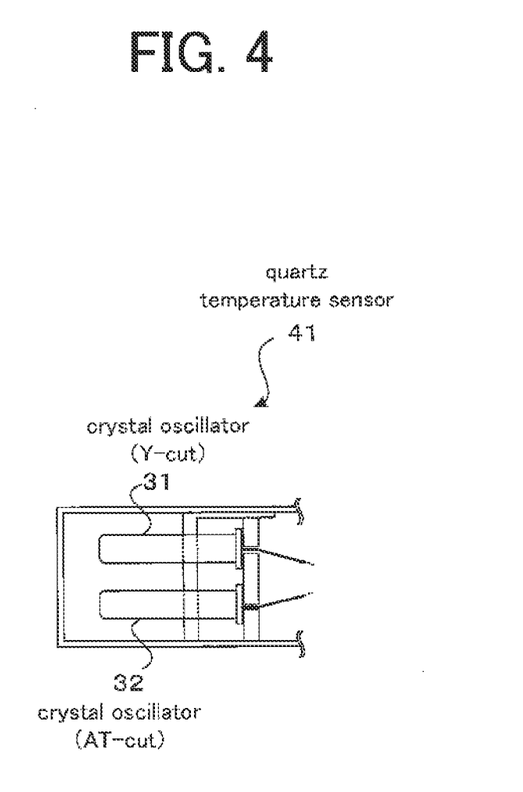
FIG. 4 is a diagram depicting an example of a structure of a quartz temperature sensor 41.

The quartz temperature sensor 41 having the crystal oscillator 31 and the crystal oscillator 32 is installed on the tip of the quartz temperature measuring probe 11 and an example of structure of this quartz temperature sensor 41 is depicted in FIG. 4. Referring to FIG. 4, it can be seen that the crystal oscillators 31, 32 are held to have the same positional relation to a location where temperature should be measured.

The frequency temperature characteristic of a crystal oscillator varies depending on its cut orientation (cut angle), which is an angle at which it is cut from a crystal material. Various names are given to different cut orientations as follows: AT-cut, BT-cut, CT-cut, SC-cut, LC-cut and Y-cut. Depending on these cut orientations, crystal oscillators have diverse frequency temperature characteristics.

Figure 5:
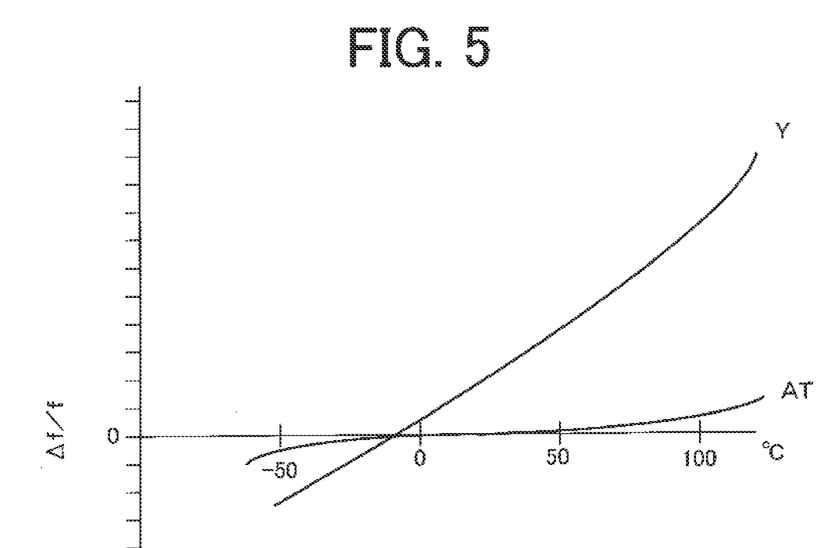
FIG. 5 is a diagram representing an example of frequency temperature characteristics of an AT-cut crystal oscillator and a Y-cut crystal oscillator in the quartz temperature measurement device of an embodiment of the present invention.

For example, for an AT-cut crystal oscillator which is widely used as the one having high stability of frequency in relation to temperature change and for a Y-cut crystal oscillator whose frequency significantly changes in relation to temperature change, an example of their frequency temperature characteristics is represented in FIG. 5. In FIG. 5, the oscillating frequency of a crystal oscillator is denoted by f and the amount of frequency change in relation to temperature change is denoted by $\Delta f$.

As can be seen by referring to FIG. 5, the oscillating frequency of the Y-cut crystal oscillator changes almost linearly, as temperature changes, whereas the oscillating frequency of the AT-cut crystal oscillator, substantially, does not change and remains constant within a certain segment, as temperature changes.

Therefore, in the quartz temperature measurement device of the present embodiment, both the AT-cut crystal oscillator which is widely used as the one having high stability of frequency in relation to temperature change and the Y-cut crystal oscillator whose frequency significantly changes in relation to temperature change are used, and temperature measurement can be performed by measuring a differential frequency between the oscillation frequencies of the both oscillators.

Figure 6:
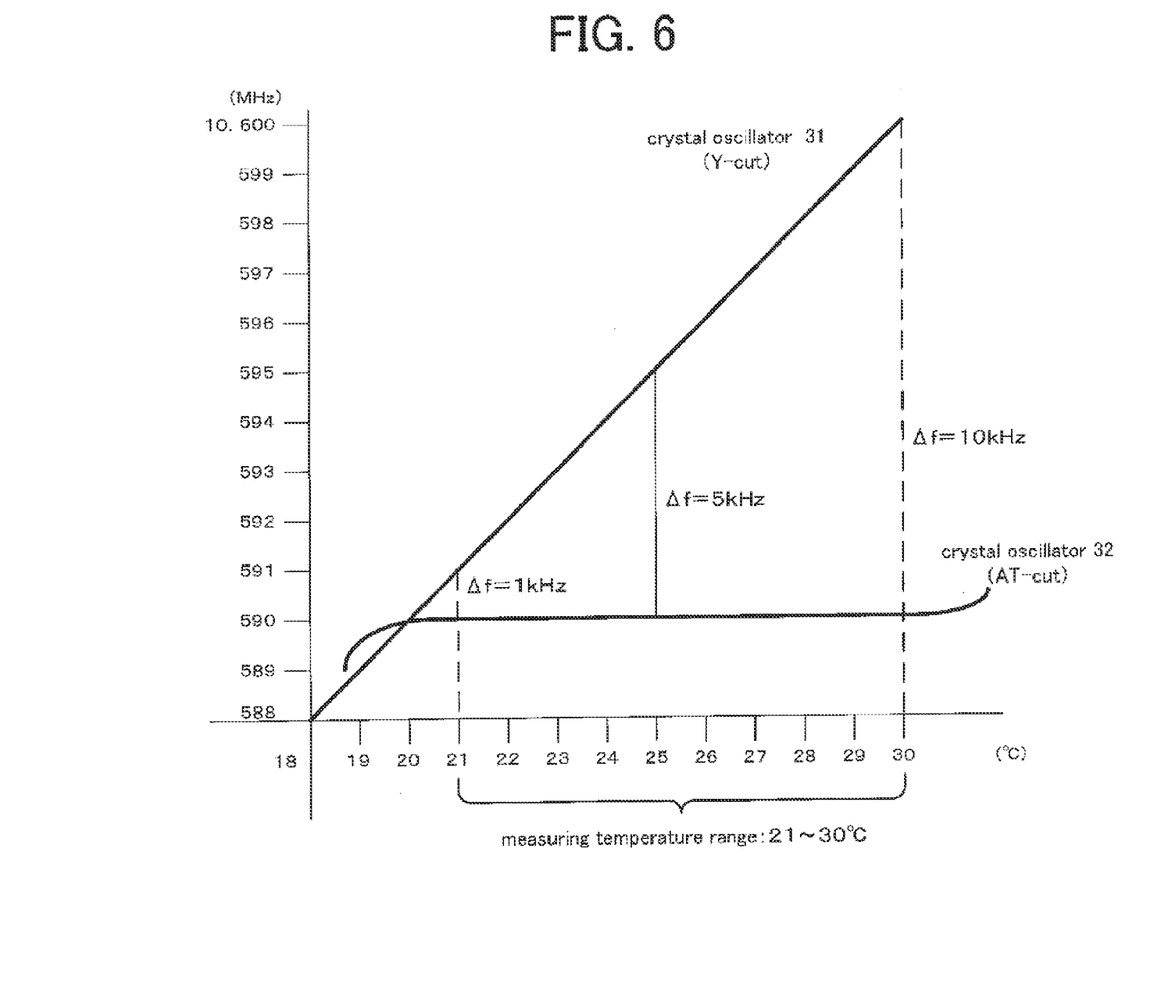
FIG. 6 is a diagram representing a relationship of oscillation frequencies to temperature, the oscillation frequencies being provided respectively by a crystal oscillator 31 (Y cut) and a crystal oscillator 32 (AT-cut) which are employed in the quartz temperature measurement device of an embodiment of the present invention.

Then, for the crystal oscillator 31 (Y-cut) and the crystal oscillator 32 (AT-cut) which are used in the present embodiment, a relationship of their oscillation frequencies to temperature is represented in FIG. 6. FIG. 6 is intended to theoretically explain a relationship of the oscillation frequencies to temperature and does not plot actual measurement frequencies.

For the quartz temperature measurement device of the present embodiment, a measuring temperature range is set to 21 to 30° C. That is, the quartz temperature measurement device of the present embodiment is arranged to implement temperature measurement with high precision of $1/1000000°$ C. (one millionth of 1° C.) within this measuring temperature range of 21 to 30° C.

In the present embodiment, the crystal oscillators 31, 32 provide a combination of oscillation frequencies such that a differential frequency between the oscillation frequencies will be less than or equal to 10 kHz within the preset measuring temperature range of 21 to 30° C. Specifically, the crystal oscillator 32 (AT-cut) is a crystal oscillator providing an oscillating frequency of about 10.59 MHz which is substantially constant within the above measuring temperature range. The crystal oscillator 31 (Y-cut) 31 is a crystal oscillator providing an oscillating frequency of about 10.595 MHz at 25° C. which is the center of the measuring temperature range. Because the oscillating frequency of the crystal oscillator 31 (Y-cut) 31 changes by about 1000 Hz with a temperature change of 1° C., its oscillating frequency becomes about 10.591 MHz at 21° C. which is a lower limit of the measuring temperature range and about 10.600 MHz at 30° C. which is an upper limit of the measuring temperature range.

Figure 7:
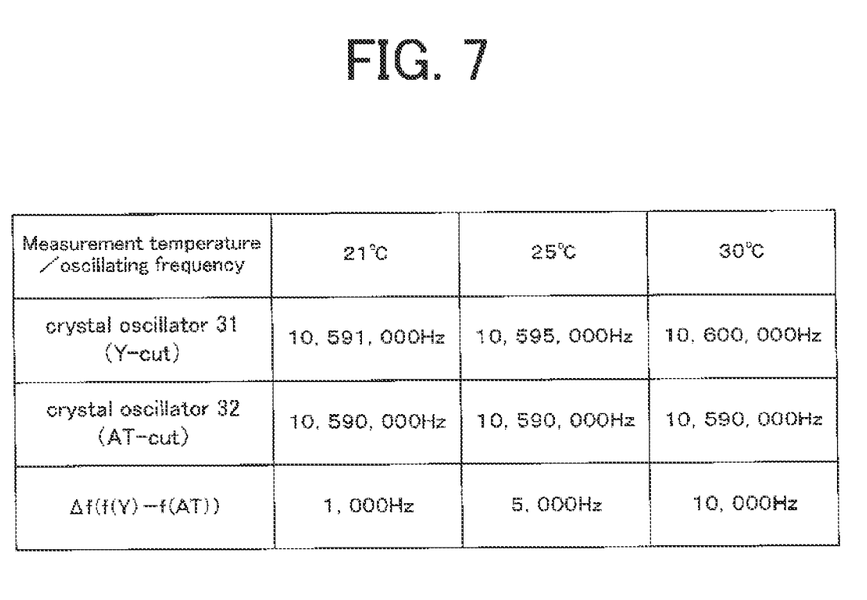
FIG. 7 is a diagram representing a correlation of the oscillation frequencies of the crystal oscillators 31, 32 and a differential frequency $\Delta f$ (f(Y)−f(AT)) in a preset measuring temperature range.

A correlation of the oscillation frequencies of the crystal oscillators 31, 32 and a differential frequency $\Delta f (f(Y)-f(AT))$ in the above measuring temperature range is represented in FIG. 7. FIG. 7 represents how ideal typical values change to simplify explanation and does not present actual measurement frequencies.

Referring to FIG. 7, it can be seen that the oscillating frequency f(Y) of the Y-cut crystal oscillator 31 significantly changes from 10,591,000 Hz to 10,595,000 Hz and to 10,600,000 Hz, as temperature changes from 21° C. to 25° C. and to 30° C. It can be seen that, in contrast, the oscillating frequency f(AT) of the AT-cut crystal oscillator 32 does not change, staying at 10,590,000 Hz, while temperature changes from 21° C. to 25° C. and to 30° C.

Therefore, as presented in FIG. 7, a differential frequency $\Delta f (f(Y)-f(AT))$ between the oscillation frequencies of the crystal oscillator 31 (Y-cut) and the crystal oscillator 32 (AT-cut) becomes about 1 kHz at a measurement temperature of 21° C., 5 kHz at a measurement temperature of 25° C., and 10 kHz at a measurement temperature of 30° C.

Thus, in the present embodiment, a differential frequency $\Delta f (f(Y)-f(AT))$ between the oscillation frequencies of the crystal oscillator 31 (Y-cut) and the crystal oscillator 32 (AT-cut) falls within a range of 1 to 10 kHz, i.e., the differential frequency is less than or equal to 10 kHz in the preset measuring temperature range of 21 to 30° C. A detailed description will be provided later for the reason why the crystal oscillators 31, 32 are thus arranged to provide a combination of oscillation frequencies such that a differential frequency between the oscillation frequencies will be less than or equal to 10 kHz within the preset measuring temperature range of 21 to 30° C.

The crystal oscillators 31, 32 are cut from a raw material of the same type (grade) and configured to be substantially equal in shape, material, and size. The crystal oscillators 31, 32 are produced through the same manufacturing method and process to the utmost extent possible. The reason why the oscillators are configured and paired in this way is because it is preferable that the crystal oscillators 31, 32 are of the same nature other than the frequency temperature characteristic. Therefore, according to the quartz temperature measurement device of the present embodiment, the crystal oscillators 31, 32 are free from variation in various properties such as aging variation, and temperature measurement with high measurement precision becomes feasible.

Now, a crystal oscillation circuit 33 uses the crystal oscillator 31 as an oscillation element and generates a signal of 10.595 MHz/25° C. (f(Y)). A crystal oscillation circuit 34 uses the crystal oscillator 32 as an oscillation element and generates a signal of 10.59 MHz/25° C. (f(AT)).

The differential frequency generating circuit 35 generates a signal of a differential frequency component of 5 kHz/25° C. ($\Delta f$) between an oscillating frequency of 10.595 MHz/25° C. from the crystal oscillation circuit 33 and an oscillating frequency of 10.59 MHz/25° C. from the crystal oscillation circuit 34.

Then, the three-wire output circuit 36 outputs a signal of 5 kHz generated by the differential frequency generating circuit 35 as a three-wire signal to the measurement apparatus main unit 10 and, besides, feeds a power supply for sensor of 5 V fed from the measurement apparatus main unit 10 to the quartz oscillation circuits 33, 34 and the differential frequency generating circuit 35 among others.

Figure 8:
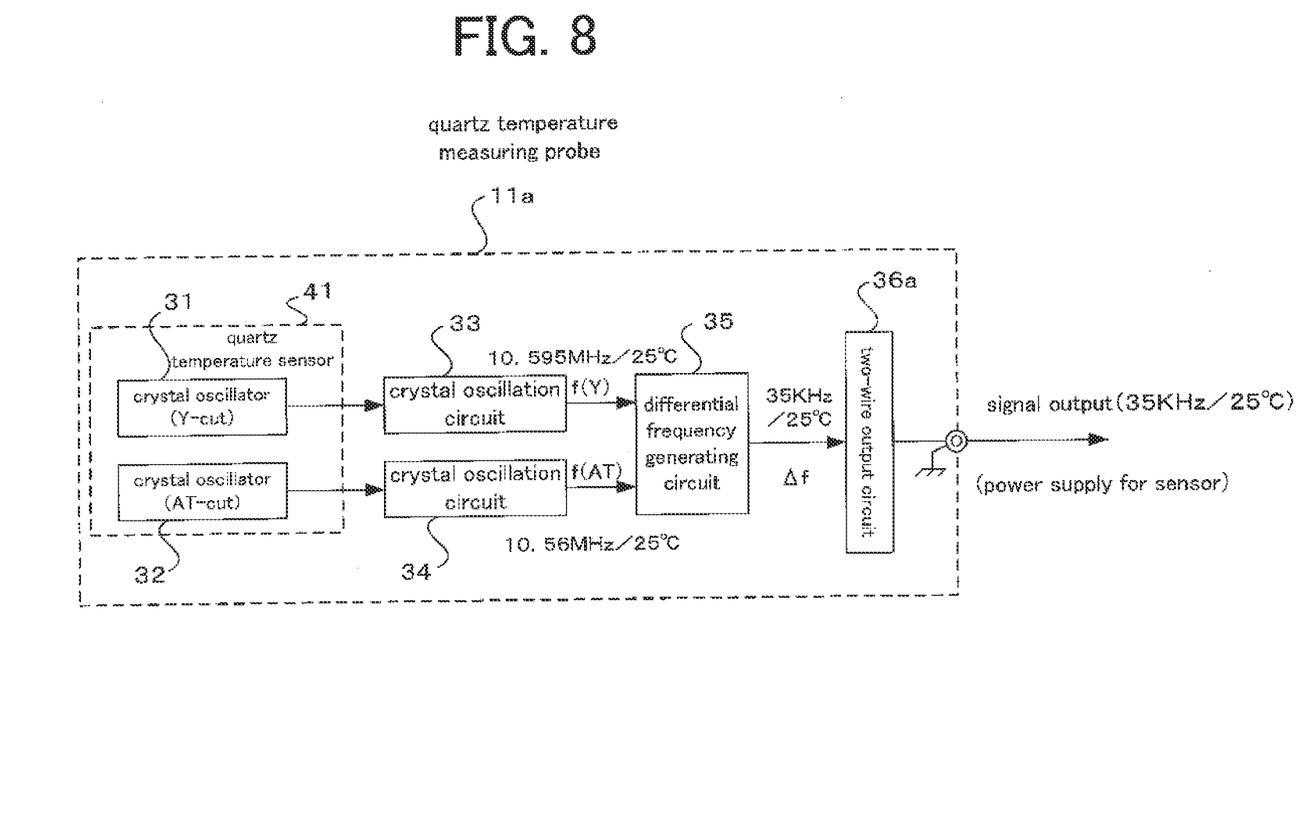
FIG. 8 is a diagram depicting a configuration of a quartz temperature measuring probe 11a which is used when the probe and the measurement apparatus main unit 10 are connected by a coaxial cable.

Next, a configuration of a quartz temperature measuring probe 11a is depicted in FIG. 8 which is used when the probe and the measurement apparatus main unit 10 are connected by a coaxial cable. This quartz temperature measuring probe 11a differs from the quartz temperature measuring probe 11 for the three-wire cable depicted in FIG. 3 only in a respect that the three-wire output circuit 36 has been replaced by a two-wire output circuit 36a.

The two-wire output circuit 36a outputs a signal of 5 kHz generated by the differential frequency generating circuit 35 to the measurement apparatus main unit 10 via the coaxial cable, and feeds a power supply for sensor of 5 V fed from measurement apparatus main unit 10, superimposed on a signal line of the coaxial cable, to the quartz oscillation circuits 33, 34 and the differential frequency generating circuit 35 among others.

In a case where the quartz temperature measuring probe 11a depicted in FIG. 8 is used, the quartz temperature measuring probe 11a and the measurement apparatus main unit 10 are connected by the coaxial cable, and the coaxial cable is connected to the BNC connector 22 of the measurement apparatus main unit 10.

For the quartz temperature measurement device of the present embodiment, because a signal that is transmitted between the quartz temperature measuring probe and the measurement apparatus main unit 10 is a low frequency signal on the order of 5 kHz/25° C., a commonly used three-wire cable can be used without using the coaxial cable. However, the use of the coaxial cable prevents intrusion of an external noise or the like into a signal output and makes it possible to achieve temperature measurement with high precision.

Next, in the measurement apparatus main unit 10, a concrete method for calculating a measurement temperature based on a differential frequency $\Delta f$ transmitted from the quartz temperature measuring probe 11 is described.

In this regard, to begin with, a description is provided about a calculation method that is applied for calculating a measurement temperature based on a measured frequency in a quartz temperature measurement device of related art in which temperature measurement is performed with only a single Y-cut crystal oscillator. This calculation is performed by using a calculation formula given in Equation (1) below.

$$f_T - f_0 = f_0(A(T-T_0) + B(T-T_0)^2 + C(T-T_0)^3) \quad (1)$$

Variables in the equation are as follows:
T: Measurement temperature
$f_T$: Oscillating frequency corresponding to measurement temperature T
$T_0$: Reference temperature
$f_0$: Oscillating frequency at reference temperature
A: Sensor coefficient (linear function)
B: Sensor coefficient (quadratic function)
C: Sensor coefficient (cubic function)

As preconditioning for temperature measurement, because the temperature characteristic of each quartz temperature sensor varies, confirmation should be made of a temperature measurement range, the number of calibration points, and temperatures to be calibrated, a calibration operation should be performed on the quartz temperature measurement device (to ensure that the frequencies corresponding to the temperatures are obtained by the quartz temperature measuring probe, using a reference temperature meter in a thermostat chamber), and oscillating frequency $f_0$ at reference temperature $T_0$ and sensor coefficients A, B, and C should be determined.

When $f_T$ is given in an actual temperature measurement process, a measurement temperature T can be calculated using predetermined $T_0$, $f_0$, A, B, and C and the above Equation (1).

Then, a description is provided about a calculation method that is applied for calculating a measurement temperature from an obtained frequency Δf in the quartz temperature measurement device of the present embodiment. The CPU 16 in the measurement apparatus main unit 10 of the quartz temperature measurement device of the present embodiment calculates a measurement temperature using the above-described Equation (1), actually, based on a frequency obtained by adding 10.59 MHz to the frequency Δf obtained by the frequency counting circuit 15, in order to use the calculation method in common with the case of temperature measurement performed only with the Y-cut crystal oscillator.

Therefore, the following description deals with the case of adding 10.59 MHz to the frequency Δf obtained by the frequency counting circuit 15 and calculating a measurement temperature. However, the present invention is not limited to such a case. The present invention can be applied similarly even in a case where a measurement temperature is directly calculated using the obtained frequency Δf.

Figure 9:
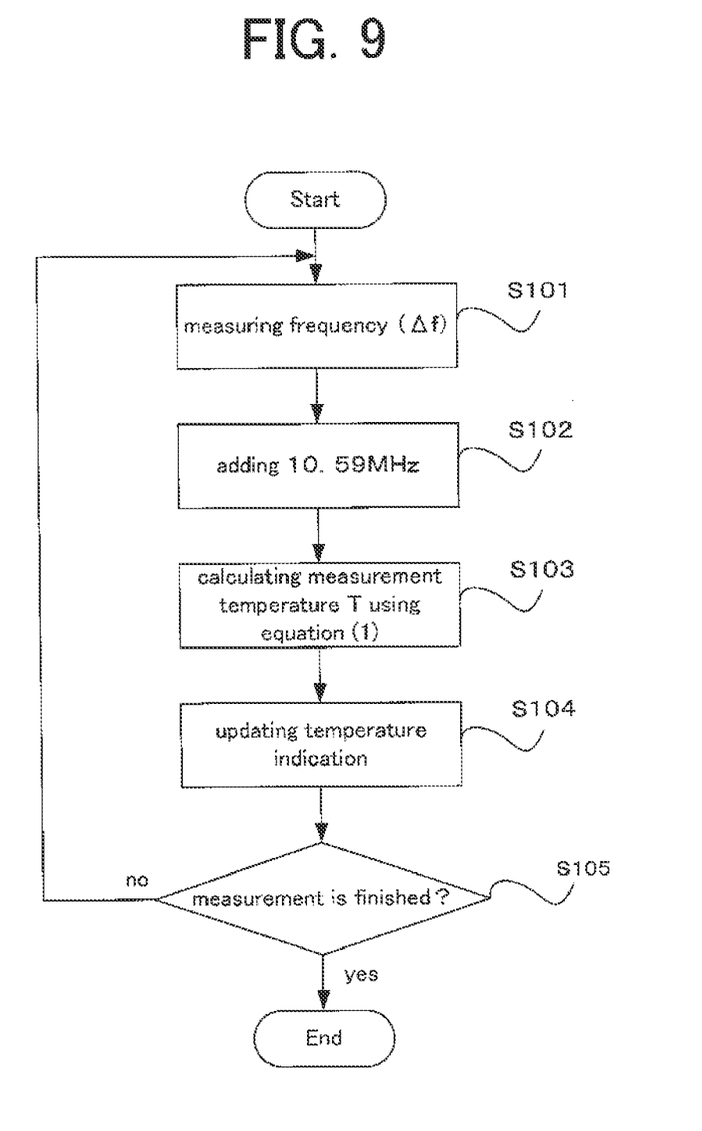
FIG. 9 is a flowchart illustrating an operation for calculating a measurement temperature in the quartz temperature measurement device of an embodiment of the present invention.

An operation for calculating a measurement temperature in the quartz temperature measurement device of the present embodiment is illustrated in a flowchart of FIG. 9.

In the measurement apparatus main unit 10, first, a differential frequency Δf of a signal transmitted from the quartz temperature measuring probe 11 is measured at the frequency counting circuit 15 (step S101).

Then, the CPU 16 adds 10.59 MHz to the measured frequency (step S102) and calculates a measurement temperature T using a frequency $f_T$ thus obtained and the above-described Equation (1) (step S103).

And the CPU 16 executes processing such as displaying a measurement temperature thus obtained on the display unit 18, thereby updating a temperature indication, outputting the measurement temperature to an external PC 40 or the like connected to the apparatus, and storing the measurement temperature into the storage device 20 (step S104). Unless measurement is finished, these steps S101 to S104 are repeated (step S105).

Next, it is described why, in the quartz temperature measurement device of the present embodiment, the crystal oscillators 31, 32 are arranged to provide a combination of oscillation frequencies such that a differential frequency between the oscillation frequencies will be less than or equal to 10 kHz within the preset measuring temperature range.

As describe previously, since the frequency counting circuit 15 in the present embodiment performs frequency measurement by the reciprocal counting method, it is able to measure the frequency of a differential signal received from the quartz temperature measuring probe 11 with measurement precision of nine significant digits, independently of the frequency of the signal under measurement. However, because a frequency error occurs also in the internal reference clock that is used for frequency counting by the frequency counting circuit 15, in the following description, measurement precision is assumed to be eight significant digits without using the ninth digit to eliminate the influence of such an error.

Here, a differential frequency Δf between the oscillation frequencies of the crystal oscillators 31, 32, which is input to the frequency counting circuit 15 via the sensor signal amplifying circuit 13, is less than or equal to 10 kHz in the preset measuring temperature range of 21 to 30° C., as mentioned previously.

Figure 10:
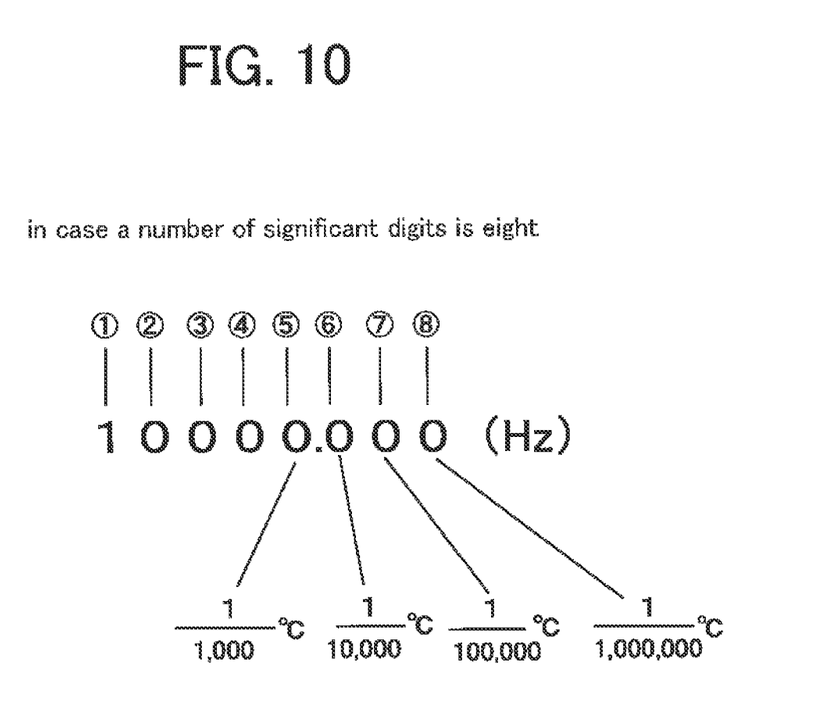
FIG. 10 is a diagram explaining precision, when a frequency is measured to eight significant digits, if a differential frequency $\Delta f$ is 10 kHz.

Therefore, if the differential frequency Δ is, for example, 10 kHz, and when a frequency measurement is performed with measurement precision of eight significant digits, as illustrated in FIG. 10, by the frequency counting circuit 15, the last four significant digits will be 0.001 Hz. That is, In the case of a differential frequency of 10 kHz, the precision of the measured frequency will be within ±0.001 Hz.

Here, the oscillating frequency of the Y-cut crystal oscillator 31 changes by about 1000 Hz with a temperature change of 1° C. That is, 1 Hz of the differential frequency Δ is equivalent to 1/1000° C. (one thousandth of 1° C.).

That is, 0.001 Hz of the differential frequency Δf is equivalent to one millionth of 1° C. The fact that a differential frequency Δf can be measured with precision within ±0.001 Hz means that a measurement temperature can be measured with precision within ±one millionth of 1° C. That is, if the frequency of a differential frequency Δf is less than or equal to 10 kHz, the measured differential frequency Δf is measured with precision within ±0.001 Hz (within ±one millionth of 1° C. in terms of temperature) and a possible error in a measurement temperature is less than or equal to one millionth of 1° C.

As explained above, if a differential frequency between the oscillation frequencies of the crystal oscillators 31, 32 is made to be less than or equal to 10 kHz in the preset measuring temperature range, and if the frequency counting circuit 15 has a capability of measuring the frequency of a differential signal received from the quartz temperature measuring probe 11 with measurement precision of at least eight or more significant digits, it is possible to make temperature measurement with high precision of one millionth of 1° C. For the foregoing reason, in the quartz temperature measurement device of the present embodiment, the crystal oscillators 31, 32 are arranged to provide a combination of oscillation frequencies such that a differential frequency between the oscillation frequencies will be less than or equal to 10 kHz within the preset measuring temperature range.

In the quartz temperature measurement device of the present embodiment, a combination of the oscillation frequencies of the crystal oscillators 31, 32 is set so that their differential frequency will be less than or equal to 10 kHz within the preset measuring temperature range. However, the oscillating frequency of the Y-cut crystal oscillator 31 changes by about 1 kHz, as temperature changes by 1° C. Thus, under such a condition, the measuring temperature range cannot be set too wide. However, if seawater temperature, crustal heat, groundwater temperature, etc. are measured, a temperature range subject to change is restricted and, thus, a somewhat small range of temperatures that can be measured does not pose a large problem.

In the quartz temperature measurement device of the present embodiment, temperature measurement with high precision of $\frac{1}{1000000}$° C. (one millionth of 1° C.) is achieved by arranging the crystal oscillators 31, 32 to provide a combination of oscillation frequencies such that a differential frequency between the oscillation frequencies will be less than or equal to 10 kHz within the preset measuring temperature range. However, if the crystal oscillators 31, 32 are arranged to provide a combination of oscillation frequencies such that a differential frequency between the oscillation frequencies will be less than or equal to 20 kHz within the preset measuring temperature range, it is possible to achieve temperature measurement with high precision of $\frac{2}{1000000}$° C. (two millionth of 1° C.), though it is impossible to achieve the precision of one millionth of 1° C. Due to similar reason, if the crystal oscillators 31, 32 are arranged to provide a combination of oscillation frequencies such that a differential frequency between the oscillation frequencies will be less than or equal to 30 kHz, 40 kHz, 50 kHz, 60 kHz, . . . , 90 kHz, it is possible to achieve temperature measurement with precision of three millionths of 1° C., four millionths of 1° C., five millionths of 1° C., six millionths of 1° C., . . . , nine millionths of 1° C., respectively. That is, if the two crystal oscillators 31, 32 are arranged to provide a combination of oscillation frequencies such that a differential frequency between the oscillation frequencies will be less than 100 kHz, it is possible to achieve temperature measurement with precision of, e.g., nine millionths of 1° C.

Moreover, due to similar reason, if the two crystal oscillators 31, 32 are arranged to provide a combination of oscillation frequencies such that a differential frequency between the oscillation frequencies will be less than 10 kHz, it is possible to achieve temperature measurement with precision of, e.g., nine ten-millionths of 1° C.

REFERENCE SIGNS LIST

10 Measurement apparatus main unit
11, 11*a* Quartz temperature measuring probe
12 Three-wire cable
13, 13*a* Sensor signal amplifying circuit
14, 14*a* Power supply circuit for sensor
15 Frequency counting circuit
16 CPU
17 Reference clock generating circuit
18 Display unit
19 Communication interface (IF) circuit
20 Storage device
21 Three-wire connection terminal block
22 BNC connector
23 Multiplier
31 crystal oscillator (Y-cut)
32 crystal oscillator (AT-cut)
33 Quartz oscillation circuit
34 Quartz oscillation circuit
35 Differential frequency generating circuit
36 Three-wire output circuit
36*a* Two-wire output circuit
40 Personal computer
41 Quartz temperature sensor

The invention claimed is:

1. A quartz temperature measuring probe comprising:
a first crystal oscillator of AT-cut orientation having a temperature characteristic in which its oscillating frequency is stable with temperature;
a second crystal oscillator of Y-cut or LC-cut orientation having a temperature characteristic in which its oscillating frequency significantly changes with temperature as compared with the first crystal oscillator;
a first oscillation circuit that generates a signal of a specific oscillating frequency, using the first crystal oscillator as an oscillation element;
a second oscillation circuit that generates a signal of a specific oscillating frequency, using the second crystal oscillator as an oscillation element; and
a differential frequency generating circuit that generates a signal of a differential frequency component between an oscillating frequency from the first oscillation circuit and an oscillating frequency from the second oscillation circuit,
wherein the frequency of the second crystal oscillator changes by about 1000 Hz with a temperature change of 1° C.;
the first crystal oscillator and the second crystal oscillator are held to have the same positional relation to a location where temperature should be measured and cut from a raw material of the same type and configured to be substantially equal in shape and material, and provide a combination of oscillation frequencies such that the frequency of a signal which is generated by the differential frequency generating circuit will be less than or equal to 10 kHz within a preset measuring temperature range; and
said quartz temperature measuring probe measuring a temperature of a target medium with a precision on the order of one millionth of 1° C. within a preset measuring temperature range.

2. A quartz temperature measurement device comprising:
a quartz temperature measuring probe including a first crystal oscillator of AT-cut orientation having a temperature characteristic in which its oscillating frequency is stable with temperature, a second crystal oscillator of Y-cut or LC-cut orientation having a temperature characteristic in which its oscillating frequency significantly changes with temperature as compared with the first crystal oscillator, a first oscillation circuit that generates a signal of a specific oscillating frequency, using the first crystal oscillator as an oscillation element, a second oscillation circuit that generates a signal of a specific oscillating frequency, using the second crystal oscillator as an oscillation element, and a differential frequency generating circuit that generates a signal of a differential frequency component between an oscillating frequency from the first oscillation circuit and an oscillating frequency from the second oscillation circuit; and
a measurement apparatus main unit including a frequency counter that measures the frequency of a signal received from the quartz temperature measuring probe, conversion means that converts a frequency measured by the frequency counter to a measurement temperature, and a display unit that displays a measurement temperature obtained by the conversion means,
wherein the frequency of the second crystal oscillator changes by about 1000 Hz with a temperature change of 1° C.;
the first crystal oscillator and the second crystal oscillator are cut from a raw material of the same type and configured to be substantially equal in shape and material, and provide a combination of oscillation frequencies such that the frequency of a signal which is generated by the differential frequency generating circuit will be less than or equal to 10 kHz within a preset measuring temperature range;

the frequency counter measures the frequency of a signal received from the quartz temperature measuring probe to obtain at least eight or more significant digits; and said quartz temperature measurement device measuring a temperature of a target medium with a precision on the order of one millionth of 1° C. within a preset measuring temperature range.

3. The quartz temperature measurement device according to claim 2, wherein the frequency counter measures the frequency of a signal received from the quartz temperature measuring probe by a reciprocal counting method.

* * * * *